United States Patent
Vora et al.

(10) Patent No.: US 12,409,855 B2
(45) Date of Patent: Sep. 9, 2025

(54) MANAGING MANEUVERS FOR AUTONOMOUS VEHICLES IN CERTAIN SITUATIONS

(71) Applicant: Waymo LLC, Mountain View, CA (US)

(72) Inventors: Mishika Vora, Hayward, CA (US); Matthew Paul McNaughton, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 394 days.

(21) Appl. No.: 17/579,112

(22) Filed: Jan. 19, 2022

(65) Prior Publication Data
US 2023/0227065 A1    Jul. 20, 2023

(51) Int. Cl.
*B60W 60/00*   (2020.01)
*B60W 30/18*   (2012.01)
*B60W 40/04*   (2006.01)

(52) U.S. Cl.
CPC .. *B60W 60/0011* (2020.02); *B60W 30/18036* (2013.01); *B60W 40/04* (2013.01);
(Continued)

(58) Field of Classification Search
CPC ....... B60W 60/0011; B60W 30/18036; B60W 40/04; B60W 60/0015; B60W 2554/20;
(Continued)

(56) References Cited

U.S. PATENT DOCUMENTS

| | | | |
|---|---|---|---|
| 8,560,175 B2 | 10/2013 | Hoffsommer et al. | |
| 8,903,567 B2 | 12/2014 | Morimoto et al. | |

(Continued)

FOREIGN PATENT DOCUMENTS

| | | | |
|---|---|---|---|
| KR | 20180053081 A | 5/2018 | |
| KR | 20180130313 A | 12/2018 | |
| KR | 20190091366 A | 8/2019 | |

OTHER PUBLICATIONS

International Search Report and Written Opinion for Application No. PCT/US2020/045406 dated Nov. 27, 2020.
(Continued)

*Primary Examiner* — Peter D Nolan
*Assistant Examiner* — Anwar Mohamed
(74) *Attorney, Agent, or Firm* — Botos Churchill IP Law

(57) ABSTRACT

Aspects of the disclosure provide a method of managing maneuvering of an autonomous vehicle in certain situations. For instance, a state of the autonomous vehicle may be identified, for example by one or more processors of a planning system of a vehicle, a state of the autonomous vehicle. Based on the state of the autonomous vehicle, the one or more processors of the forward planning system may determine whether the autonomous vehicle has become stuck. Based on the determination that the autonomous vehicle has become stuck, engaging a maneuver planning system having one or more processors capable of generating trajectories that allow the autonomous vehicle to maneuver in reverse may be engaged. After engaging the maneuver planning system, a new trajectory for the autonomous vehicle to follow may be generated. The autonomous vehicle may be controlled according to the new trajectory.

19 Claims, 11 Drawing Sheets

(52) U.S. Cl.
CPC ..... *B60W 60/0015* (2020.02); *B60W 2554/20* (2020.02); *B60W 2554/4046* (2020.02); *B60W 2554/80* (2020.02)

(58) Field of Classification Search
CPC ..... B60W 2554/4046; B60W 2554/80; B60W 30/18027
See application file for complete search history.

(56) References Cited

U.S. PATENT DOCUMENTS

| | | | |
|---|---|---|---|
| 9,523,984 | B1 | 12/2016 | Herbach et al. |
| 10,126,136 | B2 * | 11/2018 | Iagnemma ............ G01C 21/34 |
| 10,241,508 | B2 | 3/2019 | Fairfield et al. |
| 10,311,731 | B1 | 6/2019 | Li et al. |
| 10,325,502 | B2 | 6/2019 | Colella et al. |
| 10,401,863 | B2 | 9/2019 | Gao et al. |
| 10,759,433 | B2 | 9/2020 | Falconer et al. |
| 10,775,788 | B2 | 9/2020 | Kim et al. |
| 10,793,143 | B2 | 10/2020 | Lee et al. |
| 10,909,866 | B2 | 2/2021 | Jacobus et al. |
| 11,029,687 | B2 | 6/2021 | Herbach et al. |
| 11,048,256 | B2 | 6/2021 | Dyer et al. |
| 2007/0075875 | A1 | 4/2007 | Danz et al. |
| 2011/0054739 | A1 | 3/2011 | Bammert et al. |
| 2017/0229020 | A1 | 8/2017 | Colella et al. |
| 2018/0136655 | A1 | 5/2018 | Kim et al. |
| 2018/0164830 | A1 | 6/2018 | Moosaei et al. |
| 2018/0170365 | A1 | 6/2018 | Shani |
| 2018/0304926 | A1 | 10/2018 | Ghose et al. |
| 2018/0339700 | A1 | 11/2018 | Lee et al. |
| 2019/0137290 | A1 | 5/2019 | Levy et al. |
| 2019/0156678 | A1 | 5/2019 | Cole |
| 2020/0150660 | A1 | 5/2020 | Kim et al. |
| 2021/0055728 | A1 | 2/2021 | Pomish |
| 2021/0107484 | A1 * | 4/2021 | Green ............... B60W 50/0097 |
| 2021/0278844 | A1 * | 9/2021 | Dyer ............... B60W 30/18036 |
| 2022/0221294 | A1 * | 7/2022 | Kumar ................ G08G 1/0112 |
| 2022/0297725 | A1 * | 9/2022 | Zwiener .......... B60W 30/18163 |
| 2023/0211803 | A1 * | 7/2023 | Klanner .......... B60W 30/18145 |
| | | | 701/23 |

OTHER PUBLICATIONS

Maxim Likhachev and Dave Ferguson, Planning Long Dynamically-Feasible Maneuvers for Autonomous Vehicles, University of Pennsylvania Scholarly Commons Lab Papers (GRASP), Jun. 25, 2008, pp. 1-10.

* cited by examiner

MANAGING MANEUVERS FOR AUTONOMOUS VEHICLES IN CERTAIN SITUATIONS

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

BRIEF SUMMARY

Aspects of the disclosure provide a method of managing maneuvering of an autonomous vehicle in certain situations. The method includes identifying, by one or more processors of a planning system of the autonomous vehicle, a state of the autonomous vehicle; based on the state of the autonomous vehicle, determining, by the one or more processors of the forward planning system, whether the autonomous vehicle has become stuck; based on the determination that the autonomous vehicle has become stuck, automatically engaging, by the one or more processors of the forward planning system, a maneuver planning system having one or more processors capable of generating trajectories that allow the autonomous vehicle to maneuver in reverse; and after engaging the maneuver planning system, generating, by the one or more processors of the forward planning system, a new trajectory for the autonomous vehicle to follow; and controlling the autonomous vehicle according to the new trajectory.

In one example, the forward planning system is limited to generating trajectories that do not require the autonomous vehicle to travel in reverse. In another example, the state of the autonomous vehicle is pulling out after a pick up or drop off of passengers or goods. In another example, determining whether the autonomous vehicle has become stuck is based on a plurality of heuristics. In this example, the heuristics include looking for a simulated barrier associated with an object that is within a predetermined threshold distance of the autonomous vehicle. In addition, the simulated barrier is a location that the autonomous vehicle will not cross without first stopping or yielding. In addition or alternatively, the object is a road user object including one of a pedestrian, bicyclist, or vehicle. In addition or alternatively, the heuristics further include determining that the object is unlikely to move. In this example, the object is unlikely to move when it is associated with a label identifying that the object is a parked vehicle. In addition or alternatively, the object is unlikely to move when a behavior prediction for the object indicates a likelihood that the object will begin moving that is less than a threshold value. In addition or alternatively, the method also includes providing, by the one or more processors of the forward planning system, a destination to the one or more processors of the maneuver planning system, wherein the destination is beyond a simulated barrier. In another example, the method also includes providing, by the one or more processors of the forward planning system, a destination to the one or more processors of the maneuver planning system, wherein the destination is a point along a route generated by a routing system of the autonomous vehicle. In this example, generating the new trajectory is based on when the autonomous vehicle reaches the destination. In addition or alternatively, the method also includes automatically disengaging the maneuver planning system when the autonomous vehicle is determined to no longer be stuck. In addition or alternatively, once the autonomous vehicle reaches the destination, automatically disengaging the maneuver planning system is automatically. In another example, the maneuver planning system includes constraints on a distance the autonomous vehicle is able to maneuver in reverse. In another example, the maneuver planning system includes constraints on the autonomous vehicle crossing into a lane. In another example. the one or more processors of the maneuver planning system includes constraints on the autonomous vehicle crossing more than one other lane. In another example, the method also includes, before automatically engaging the maneuver planning system, waiting a predetermined period of time to allow the forward planning system to confirm that the forward planning system is unable to generate a trajectory before engaging the maneuver planning system.

Other aspects of the disclosure provide a system for managing maneuvering of an autonomous vehicle in certain situations. The system includes a planning system having one or more processors configured to: identify a state of the autonomous vehicle; based on the state of the autonomous vehicle, determine whether the autonomous vehicle has become stuck; based on the determination that the autonomous vehicle has become stuck, automatically engage a maneuver planning system having one or more processors capable of generating trajectories that allow the autonomous vehicle to maneuver in reverse; and after engaging the maneuver planning system, generate a new trajectory for the autonomous vehicle to follow; and control the autonomous vehicle according to the new trajectory.

DETAILED DESCRIPTION

Overview

Figure 1:
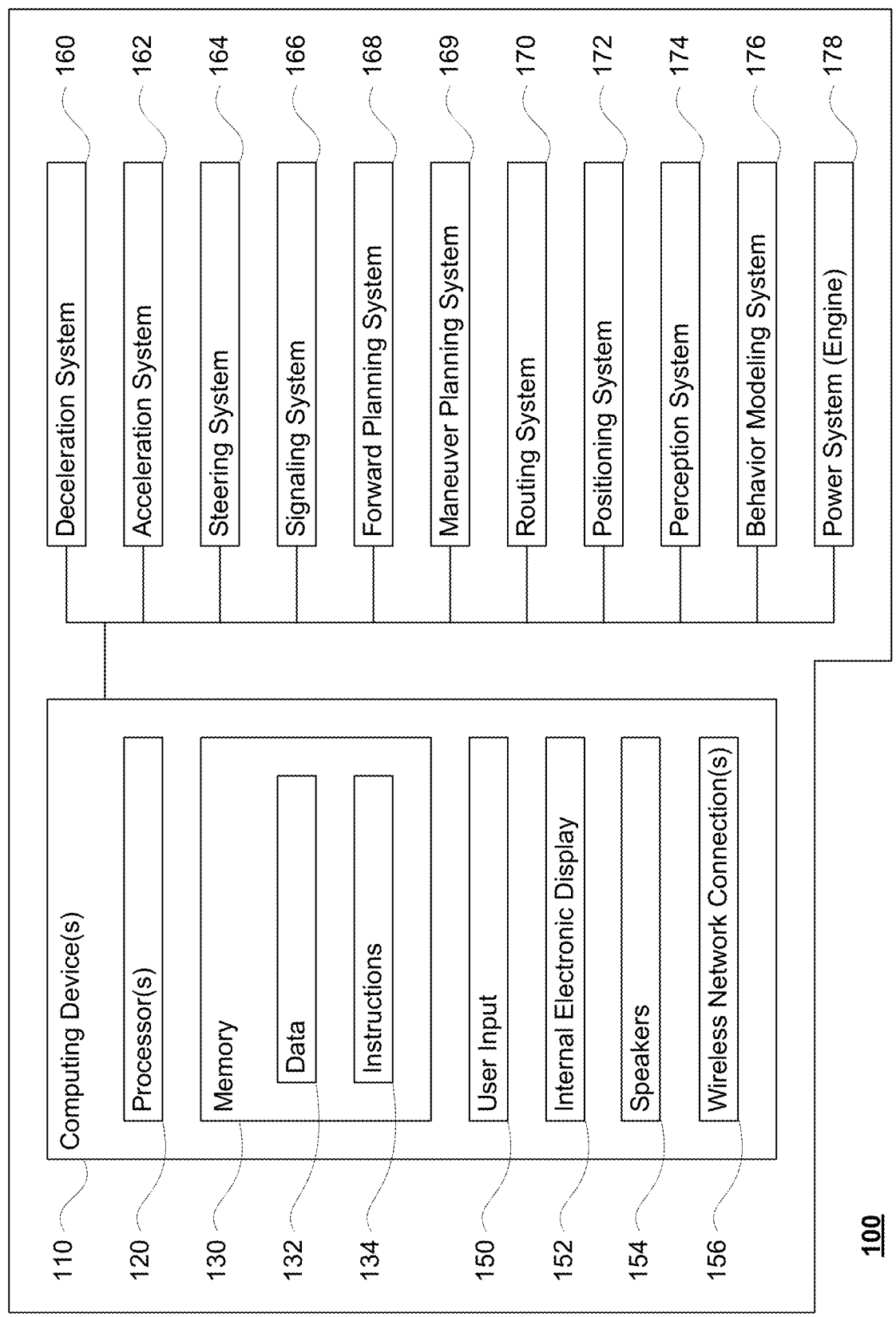
FIG. 1 is a functional diagram of an example vehicle in accordance with an exemplary embodiment.

The technology relates to managing maneuvers for autonomous vehicles in certain situations, such as those where the autonomous vehicle is effectively "stuck". Such situations may occur when the autonomous vehicle is no longer able to make forward progress along a route to a destination without moving in reverse (i.e. "backing up" or switching the autonomous vehicle's drive train from a drive mode to a reverse mode).

Some systems may utilize complex machine learned models for determining whether an autonomous vehicle is actually stuck. For instance, output from various systems of the autonomous vehicle may be input into a machine learned model which essentially labels the current situation as stuck to some likelihood or confidence. If so, a notification may be sent to a remote human operator for assistance. However, such systems may tend to be overly conservative and may require a human operator to "clear" stuck labels before the autonomous vehicle is able to resume nominal operations (e.g. continue driving to a destination even where the autonomous vehicle was not actually or is no longer stuck). As such, as the number of autonomous vehicles increases, because of the need for remote human operators, such approaches may not be scalable. Moreover, the aforementioned models may be overly conservative and may trigger in situations in which the autonomous vehicle does not necessarily need to move in reverse to become unstuck.

Prior approaches for getting an autonomous vehicle out of a stuck situation have involved a remote human operator sending specific instructions to the autonomous vehicle to perform specific maneuvers or engaging such maneuver planning systems manually. For instance, when the autonomous vehicle has become stuck, a remote human operator may be notified. This remote human operator may utilize a computing device to connect with the vehicle and send specific instructions for the autonomous vehicle to perform some maneuver (e.g. reverse to this point, pull forward to this point, reverse again, etc.).

Some autonomous vehicles may utilize different planning systems for such specialized maneuvers. For example, a forward planning system may be used for nominal driving in order to allow the autonomous vehicle to plan trajectories in order to follow a route generated by a routing system. For safety and ease of implementation, the forward planning system may be limited to planning trajectories which require the autonomous vehicle to move forward (or stop) and do not allow the autonomous vehicle to move in reverse. In this regard, a specialized planning system or a "maneuver planning system" may be utilized for situations in which the autonomous vehicle is stuck. This may allow for a simplified system which can utilize different geometries (e.g. including those for reversing such as for multi-point turns), while at the same time requires much simpler "reasoning" or processing of time and speed as the maneuver planning system does not need to be capable of performing more complex maneuvers such as lane changes in traffic.

In the situation where a maneuver planning system is available, once a notification is received, the human operator may alternatively engage the maneuver planning system. However, such approaches can result in significant delays as the autonomous vehicle first must report that it has become stuck, a human operator must receive the report, the human operator must confirm the situation, the human operator must then send an instruction to the autonomous vehicle to engage the maneuver planning system, thereafter the autonomous vehicle must engage the maneuver planning system and perform the required maneuver. This process can take up to a minute or more which can potentially cause delays and unintended situations with respect to nearby traffic and can also make any passengers within the autonomous vehicle uncomfortable (e.g. such as when the autonomous vehicle performs a reverse motion when there may be plenty of space ahead as in the given example) or attempt to exit the vehicle which can be dangerous if the vehicle abruptly moves in reverse.

To reduce or even avoid the need for human operators to address such situations, when an autonomous vehicle is determined to be stuck, the forward planning system may automatically engage a maneuver planning system. However, there is a clear need to balance the ability of an autonomous vehicle to become unstuck with safety and not unnecessarily allowing the autonomous vehicle to move in reverse without a human operator confirming that this is an appropriate response. As such, the automatic engagement of the maneuver planning system may be limited to situations in which an autonomous vehicle is pulling out, such as immediately after picking up or dropping off passengers or goods or when the autonomous vehicle has otherwise been parked for an extended period of time.

In this regard, in order to engage the maneuver planning system automatically, the forward planning system may first determine that the autonomous vehicle is in a certain stage or state of driving. In one example, this may include determining whether the autonomous vehicle is "pulling out" or "unparking." In other words, if the autonomous vehicle is not in a pulling out state, the forward planning system may be prevented from the maneuver planning system. When in this state, the forward planning system generates trajectories that attempt to get the autonomous vehicle from the parked or pulled over location to a route generated by the autonomous vehicle's routing system or some other objective.

When the autonomous vehicle is in the pulling out state, the forward planning system may continuously monitor whether the autonomous vehicle is stuck using a plurality of heuristics. For instance, one approach may involve looking for nearby fences, or fences within a predetermined threshold distance of the autonomous vehicle (e.g. line of sight distance). If these fences are associated with objects that are unlikely to move, the forward planning system may determine that the autonomous is "stuck" and may automatically engage the maneuver planning system. Fences may be a safety feature which add hard or soft constraints to trajectory planning. The aforementioned predetermined threshold distance may be hand tuned and selected based upon a number of different factors.

Based on the determination that the autonomous vehicle has become stuck, the maneuver planning system may be automatically engaged. Once engaged, one or more processors of the maneuver planning system may generate trajectories in order to maneuver the autonomous vehicle to become unstuck or back to the route that the autonomous vehicle was following. Thereafter, the maneuver planning system may disengage, allowing the forward planning system to resume generating trajectories and maneuver the autonomous vehicle towards its ultimate destination.

The features described herein may allow autonomous vehicles to more readily respond to situations in which the autonomous vehicle becomes stuck. By automatically engaging a specialized planning system, this may replace the need for a remote human operator to connect with and move the autonomous vehicle to become unstuck, saving on both time and overall costs, while also limiting the situations in which the maneuver planning system is engaged automatically based on state and heuristics. This, in turn, may provide a faster, more consistent response of these autonomous vehicles in such situations. For instance, improvements may be expected in yielding time metrics, duration of an autonomous vehicle stuck, and potentially the number of times that autonomous vehicles become stuck and require assistance from remote human operators.

EXAMPLE SYSTEMS

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, forward planning system 168, maneuver planning system 169, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination using map information. Forward planning system 168 may be used by computing device 110 in order to generate short-term trajectories that allow the vehicle to follow routes generated by the routing system. In this regard, the forward planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
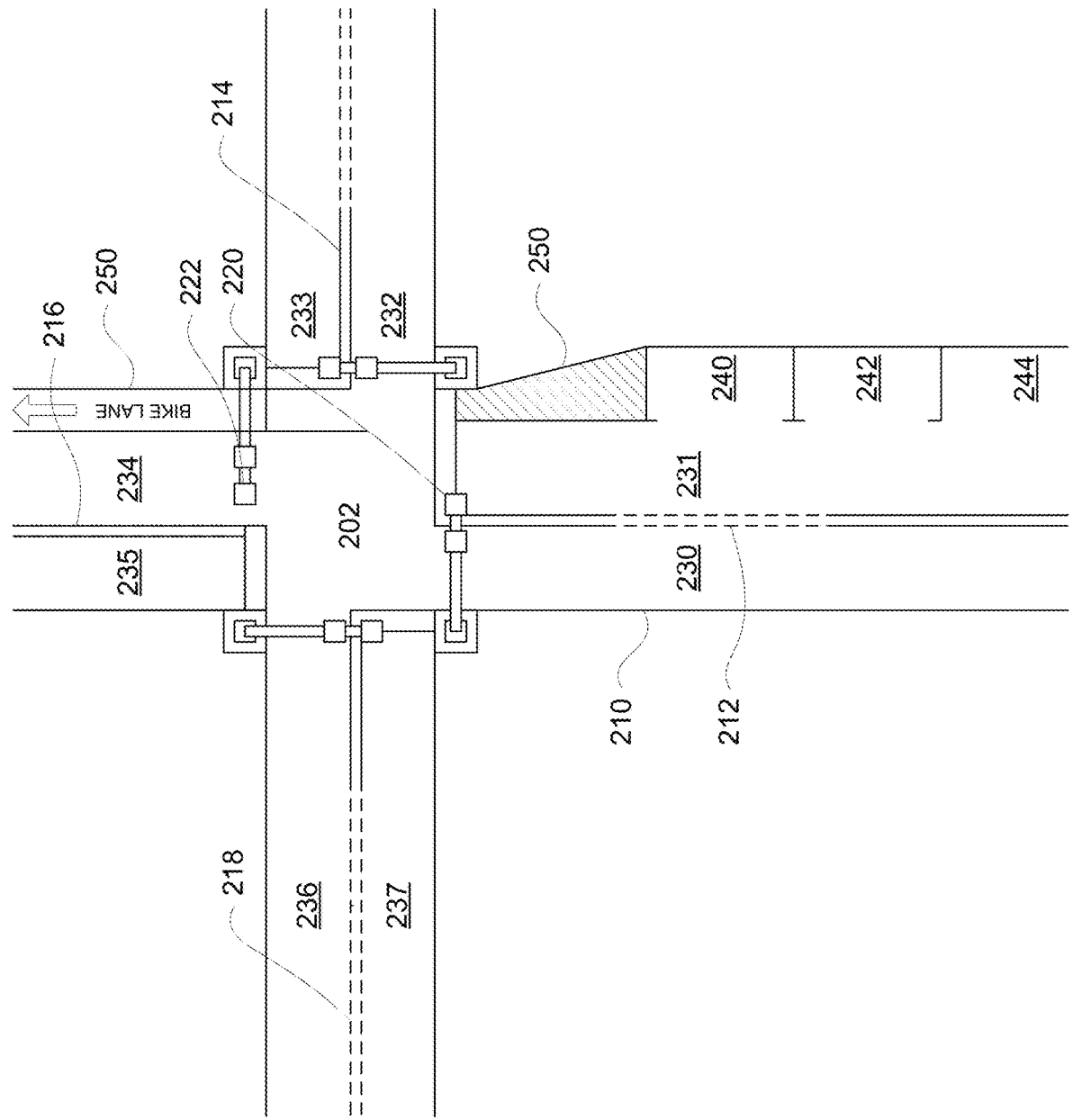
FIG. 2 is an example of map information in accordance with aspects of the disclosure.

FIG. 2 is an example of map information 200 for a section of roadway including intersection 202. The map information 200 may be a local version of the map information stored in the memory 130 of the computing devices 110. In this example, the map information 200 includes information identifying the shape, location, and other characteristics of lane lines 210, 212, 214, 216, 218 which define the shape and location of lanes 230, 231, 232, 233, 234, 235, 236, 237. The map information may also store information about the location, shape and configuration of traffic controls such as traffic signal lights 220, 222 as well as stop signs, yield signs, and other signs (not shown). The map information may also include other information that allows the computing devices 110 to determine whether the autonomous vehicle has the right of way to complete a particular maneuver (i.e. complete a turn or cross a lane of traffic or intersection).

In addition, the map information may include additional details such as the characteristics (e.g. shape, location, configuration etc.) of traffic controls including traffic signal lights (such as traffic signal lights 220, 222), signs (such as stop signs, yield signs, speed limit signs, road signs, and so on), crosswalks, sidewalks, curbs, buildings or other monuments, etc. For instance, as shown in FIG. 2, the map information identifies the shape and location of parking areas 240, 242, 244 where the autonomous vehicle may stop to wait, pickup, and/or drop off passengers and/or goods and no parking zone 250.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of a the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
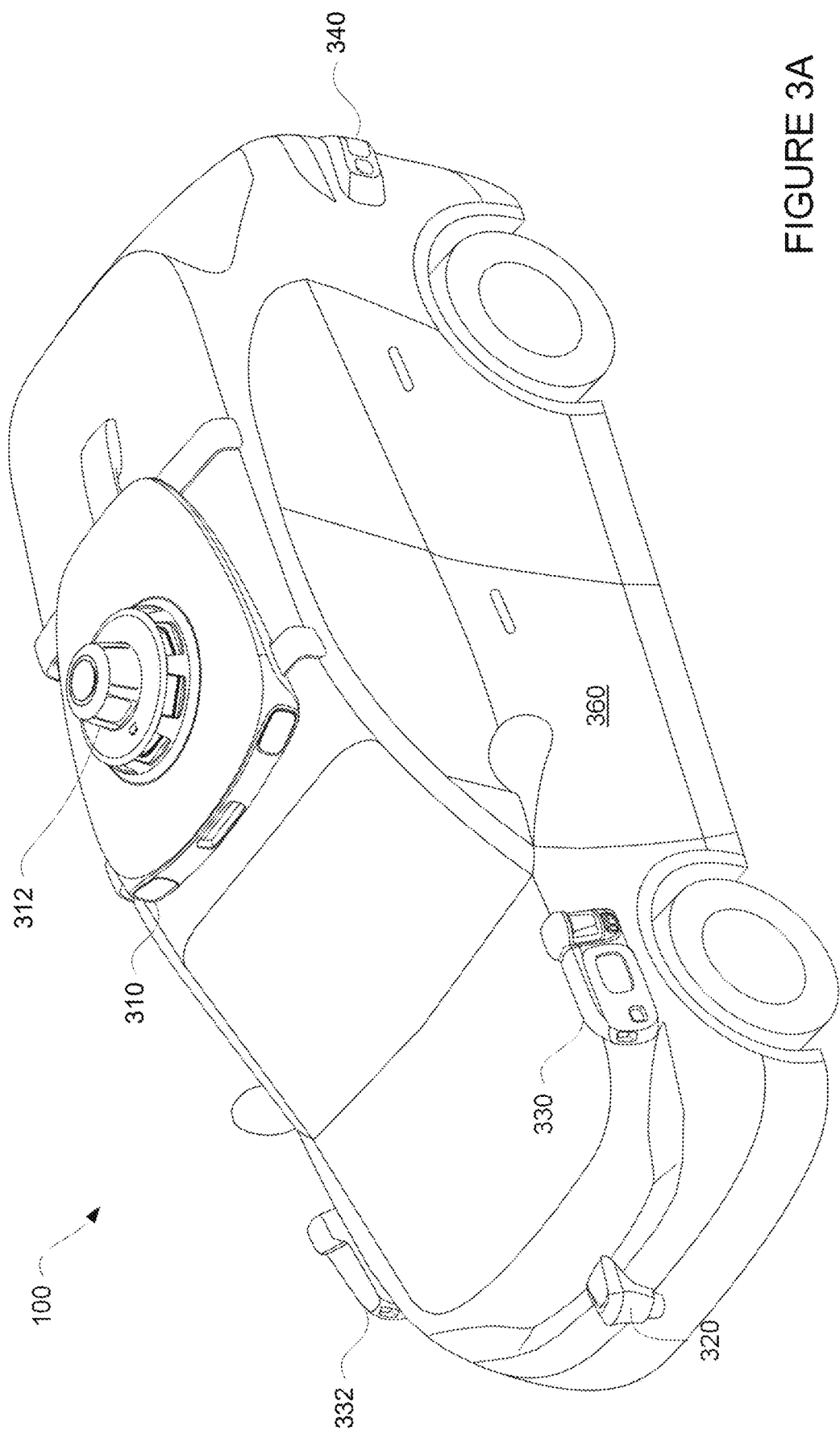
FIG. 3A-3B are example external views of a vehicle in accordance with aspects of the disclosure.
Figure 3B:
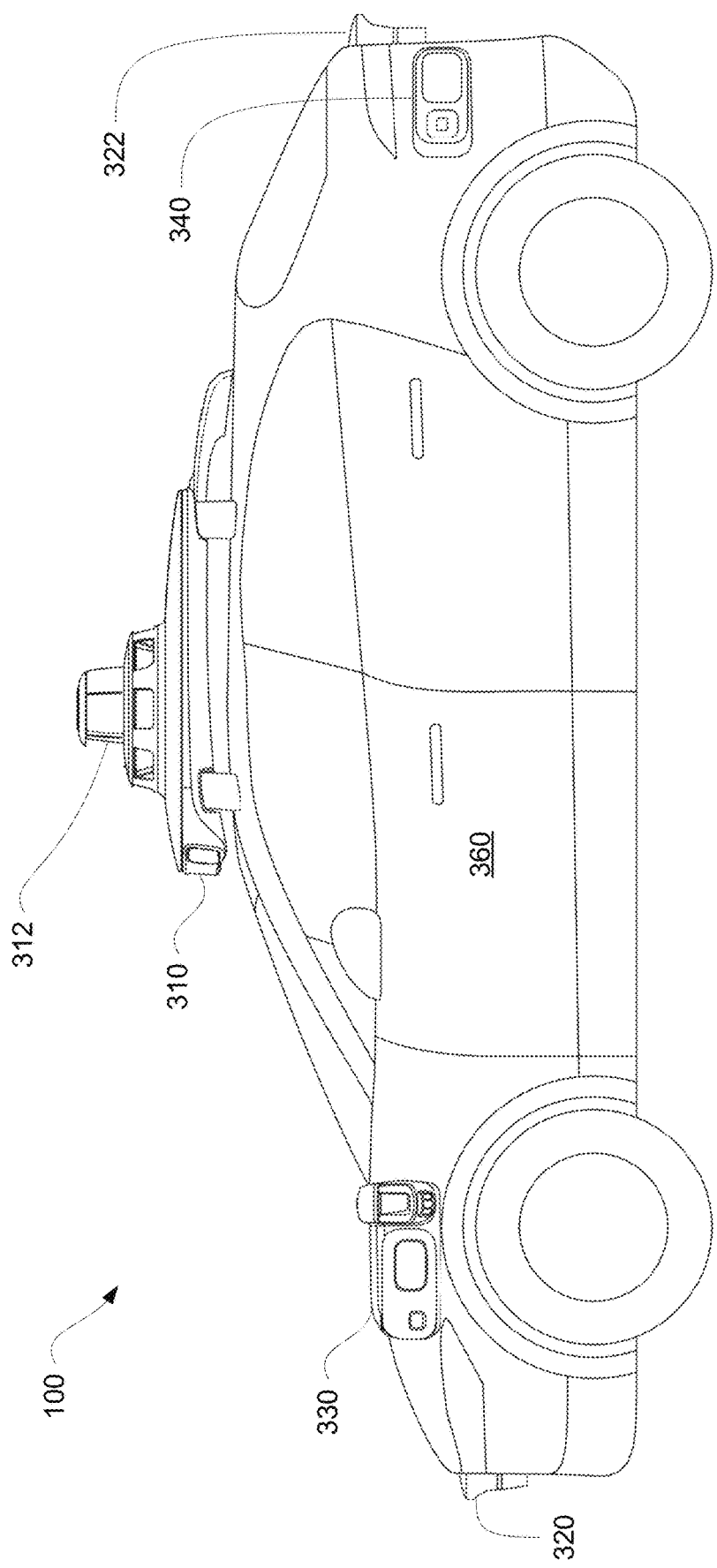

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, forward planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g. future behavior predictions or predicted future trajectories). In this regard, different models may be used for different types of objects, such as pedestrians, bicyclists, vehicles, etc. The behavior predictions or predicted trajectories may be a list of positions and orientations or headings (e.g. poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the forward planning system 168. The forward planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination. A control system software module of computing devices 110 may be configured to control movement of the vehicle, for instance by controlling braking, acceleration and steering of the vehicle, in order to follow a trajectory.

In some situations, a specialized planning system or the maneuver planning system 169 may be used as an alternative to the forward planning system 168 in order to enable the autonomous vehicle to perform specialized maneuvers. For example, the forward planning system 168 may be used for nominal driving in order to allow the autonomous vehicle to plan trajectories in order to follow a route generated by a routing system. For safety and ease of implementation, the forward planning system 168 may be limited to planning trajectories which require the autonomous vehicle to move forward (or stop) and do not allow the autonomous vehicle to move in reverse. In this regard, the maneuver planning system 169 may be utilized for situations in which the autonomous vehicle is stuck. This may allow for a simplified system which can utilize different geometries (e.g. including those for reversing such as for multipoint turns), while at the same time requires much simpler "reasoning" or processing of time and speed as the maneuver planning system does not need to be capable of performing more complex maneuvers such as lane changes in traffic.

In some instances, the maneuver planning system and forwarding planning system may actually each be software modules of a larger planning system that are utilized at different times in accordance with the features described herein.

The computing devices 110 may control the vehicle in one or more of the autonomous driving modes by controlling various components. For instance, by way of example, computing devices 110 may navigate the vehicle to a destination location completely autonomously using data from the detailed map information and forward planning system 168. Computing devices 110 may use the positioning system 170 to determine the vehicle's location and perception system 174 to detect and respond to objects when needed to reach the location safely. Again, in order to do so, computing device 110 and/or forward planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
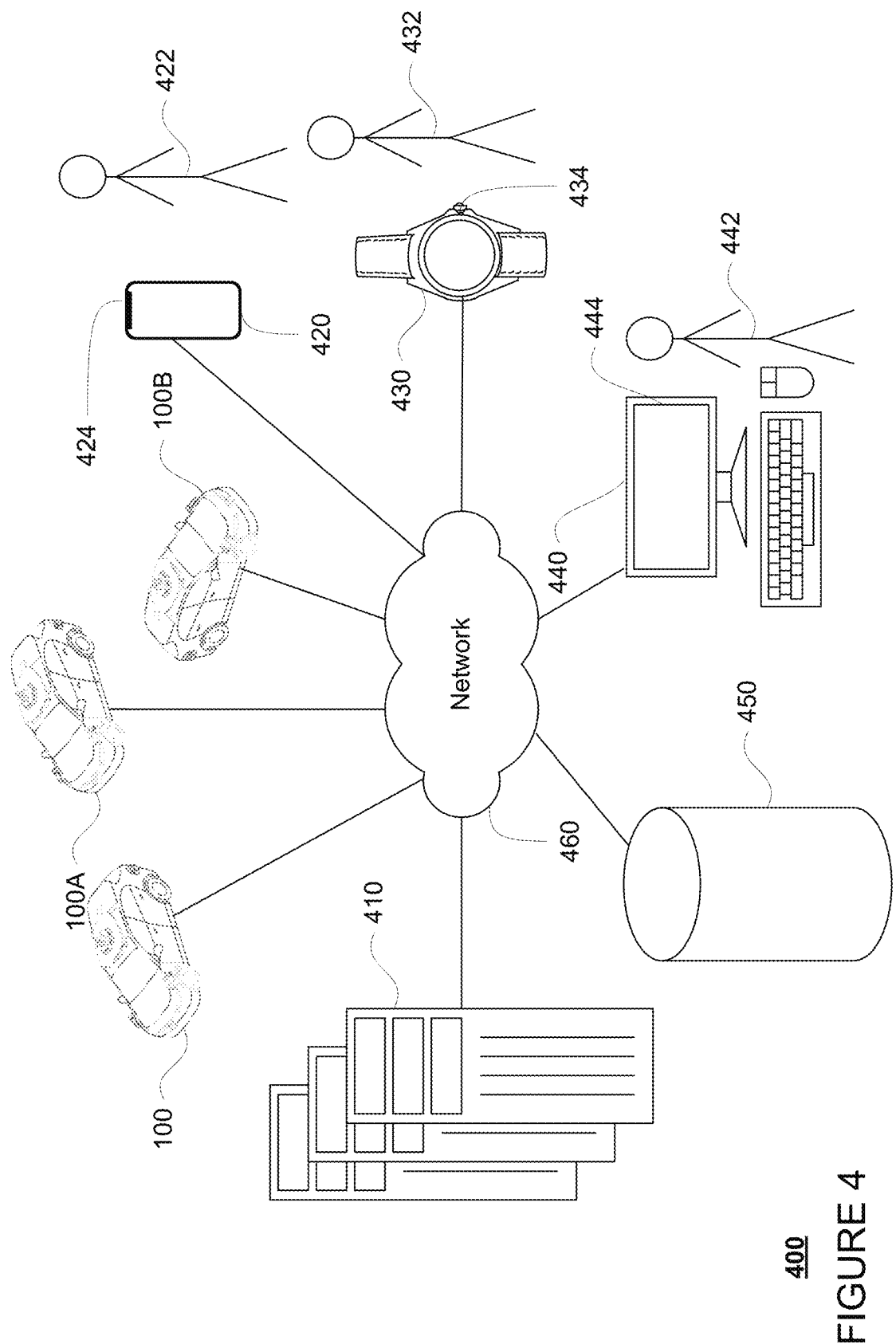
FIG. 4 is a pictorial diagram of an example system in accordance with aspects of the disclosure.
Figure 5:
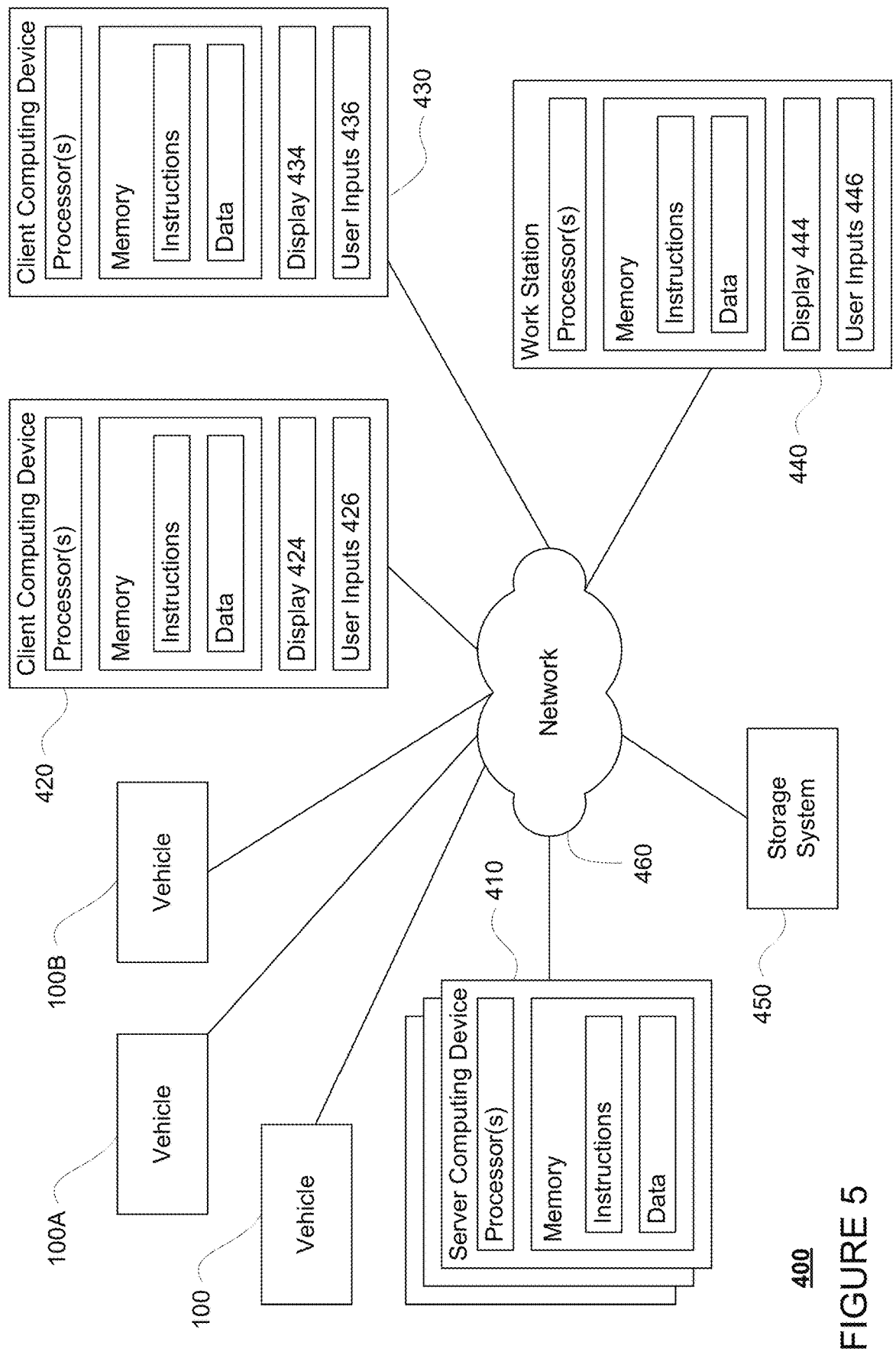
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of a vehicle. In other words, user 422 may represent a passenger. In addition, client computing device 430 may represent a smart watch for a passenger of a vehicle. In other words, user 432 may represent a passenger. The client computing device 440 may represent a workstation for an operations person, for example, a remote assistance operator or someone who may provide remote assistance to a vehicle and/or a passenger. In other words, user 442 may represent an operator (e.g. operations person) of a transportation service utilizing the autonomous vehicles 100, 100A, 100B. Although only a few passengers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc. Storage system 450 may store various types of information which may be retrieved or otherwise accessed by a server computing device, such as one or more server computing devices 410, in order to perform some of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
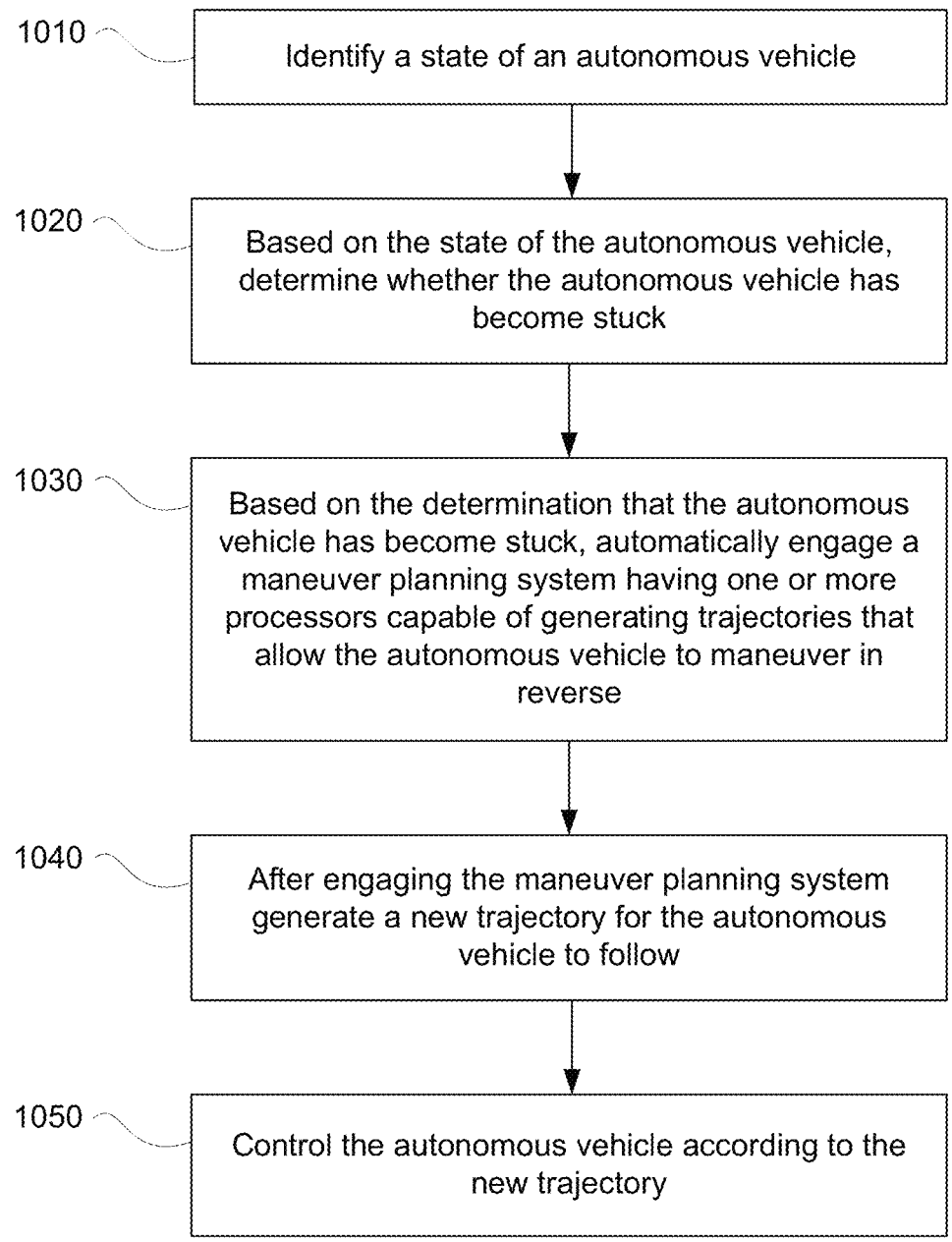
FIG. 10 is a flow diagram in accordance with aspects of the disclosure

FIG. 10 is an example flow diagram 1000 for managing maneuvering of an autonomous vehicle in certain situations may be performed by one or more processors, such as the one or more processors of the forward planning system 168 and/or the one or more processors 120 of the computing devices 110 of autonomous vehicle 100 or other processors of the autonomous vehicle 100. At block 1010, a state of the autonomous vehicle is identified.

In this regard, in order to engage the maneuver planning system automatically, the forward planning system 168 and/or computing devices 110 may first determine that the autonomous vehicle is in a certain stage or state, corresponding to when the autonomous vehicle is "pulling out" or "unparking" as compared to states like "pulling over" or "parked." In other words, if the autonomous vehicle is not in a pulling out state, the forward planning system may be prevented from the maneuver planning system. When in this state, the forward planning system may generate trajectories that attempt to get the autonomous vehicle from the parked or pulled over location to a route generated by the autonomous vehicle's routing system or some other objective.

Figure 6:
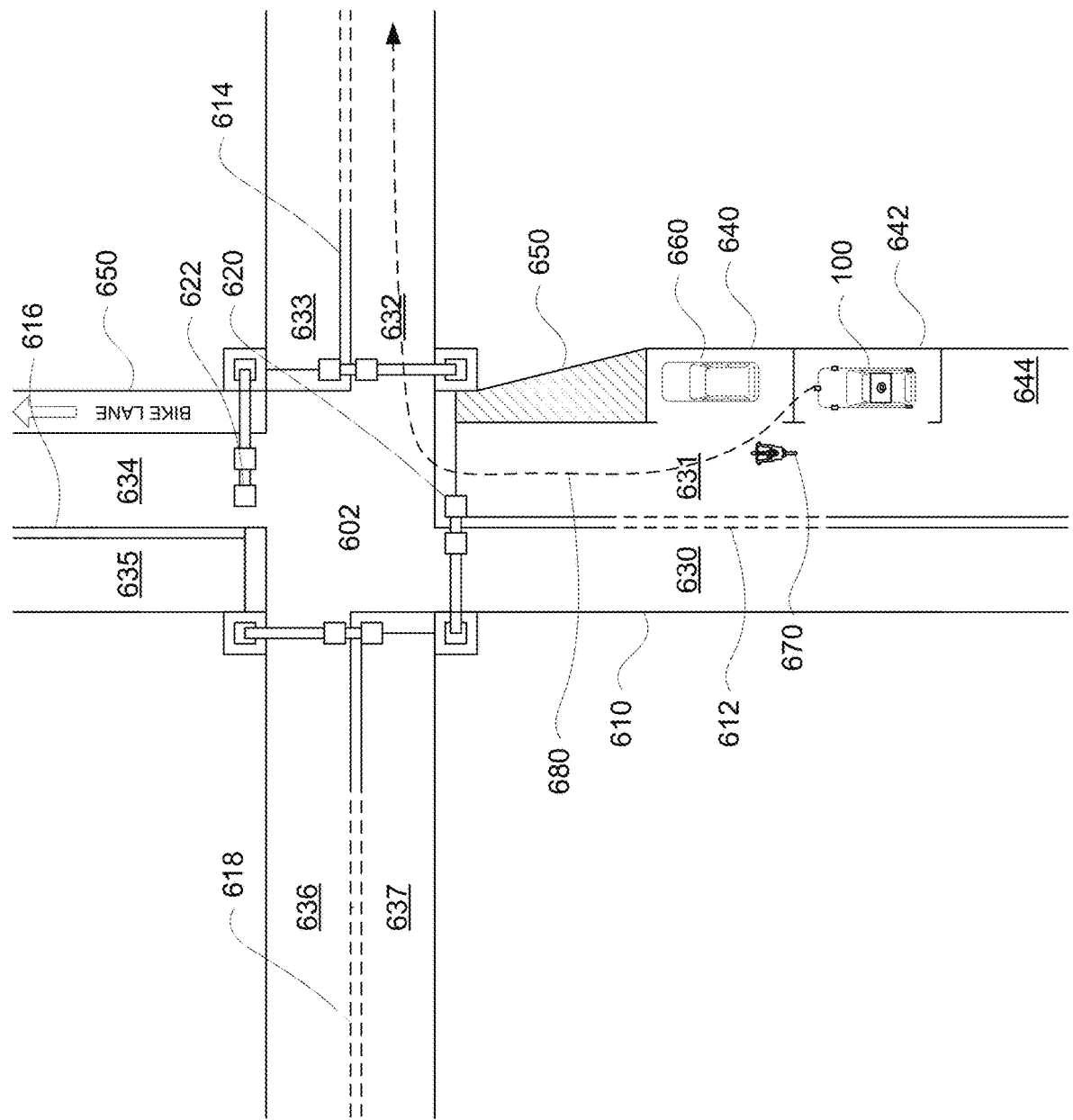
FIG. 6 is an example of an autonomous vehicle and data depicted with respect to a geographic area in accordance with aspects of the disclosure.

FIG. 6 depicts autonomous vehicle 100 in a geographic area 600 corresponding to the map information 200. In this example, intersection 602 corresponds to intersection 202, lane lines 610, 612, 614, 616, 618 correspond to lane lines 210, 212, 214, 216, 218, lanes 630, 631, 632, 633, 634, 635, 636, 637 correspond to lanes 230, 231, 232, 233, 234, 235, 236, 237, traffic signal lights 620, 622 correspond to traffic signal lights 220, 222, parking areas 640, 642, 644 correspond to parking areas 240, 242, 244, no parking zone 650 corresponds to no parking zone 250, and so on.

In this example, the autonomous vehicle 100 is currently in the parked state and parked in the parking area 640. At this point, the routing system 170 may generate a route 680 for the autonomous vehicle to follow in order to reach a destination (not shown as it is beyond the geographic area 600). In addition, the perception system 174 may detect and identify objects including road users such as vehicle 660 and bicyclist 670.

Returning to FIG. 10, at block 1020, based on the state of the autonomous vehicle, the autonomous vehicle has become stuck is determined. When the autonomous vehicle is in the pulling out state, the forward planning system 168 and/or computing devices 110 may continuously monitor whether the autonomous vehicle is stuck using a plurality of heuristics. For instance, one approach may involve looking for nearby fences, or fences (or alternatively the objects associated with those fences) within a predetermined threshold distance of a reference point of the autonomous vehicle such as a radial or line of sight distance. This reference point may be the closest point on the autonomous vehicle to the fence (or alternatively the object associated with the fence) or some more specific location (e.g. a point on the front bumper, rear axle, etc.). If these fences are associated with objects that are unlikely to move, the forward planning system may determine that the autonomous is "stuck" and may automatically engage the maneuver planning system.

Fences may be a safety feature which the forward planning system may add hard or soft constraints to trajectory planning. For instance, a fence may represent simulated "barriers" that the autonomous vehicle's computing devices will not cross without first stopping or yielding (e.g. the autonomous vehicle will always stop or yield to other objects before the location of a fence). For example, the entrance of an intersection may be associated with a fence when the autonomous vehicle's computing devices have determined that the autonomous vehicle will stop because of a red light or an expected red light. Fences may also be used in situations in which there are persons crossing in a crosswalk or stopped traffic in front of the autonomous vehicle. In this regard, as noted above, fences may be associated with specific objects, such as road user objects including pedestrians, bicyclists, vehicles, etc.

Figure 7:
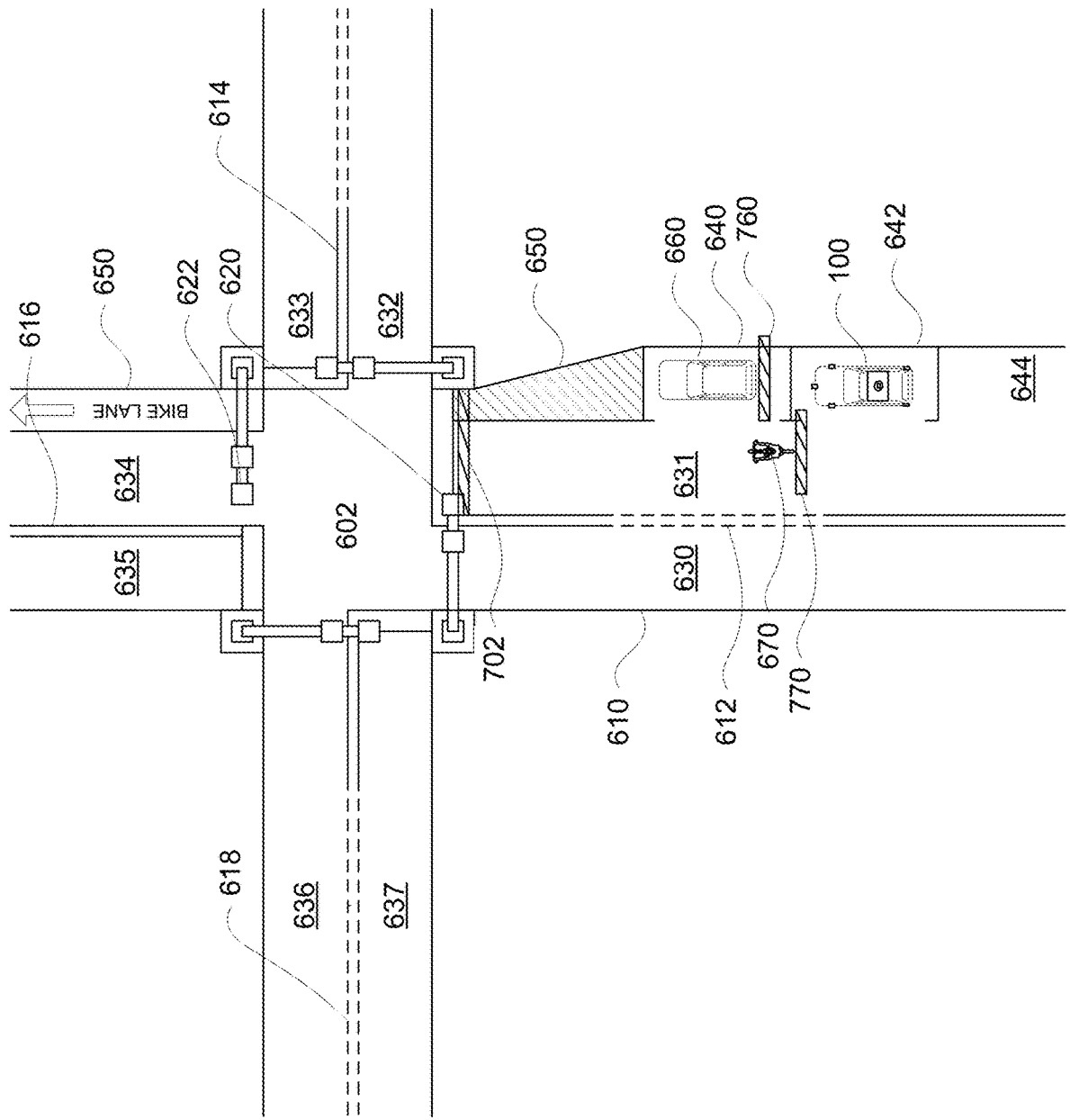
FIG. 7 is another example of an autonomous vehicle and data depicted with respect to a geographic area in accordance with aspects of the disclosure.

Turning to FIG. 7, the perception system 168 and/or computing devices 110 may identify a plurality of fences generated by the forward planning system. For example, fence 702 is associated with intersection 602 (intersection 202), fence 760 corresponds to vehicle 660, and fence 770 corresponds to bicyclist 670. In this regard, the fence 702 may be associated with an entrance to the intersection 602 because of a red light or an expected red light of the traffic signal light 620 or traffic signal light 622. As indicated above, the fence may be used to prevent the autonomous vehicle 100 from entering the intersection 602 without first stopping. Fence 760 may be associated with the vehicle 660 may be used to cause the autonomous vehicle to yield to the vehicle 660. Similarly fence 770 may be associated with the bicyclist 670 may be used to cause the autonomous vehicle to yield to the bicyclist 670.

The aforementioned predetermined threshold distance may be hand tuned and selected based upon a number of different factors. Such factors may include the distance to objects that have caused the autonomous vehicles to become stuck in the past, such as 10 to 15 meters with an additional buffer distance to ensure that the forward planning system is able to engage the maneuver planning system when actually needed such as 5 meters or more or less. This additional buffer distance may also allow for the collection of data on situations in which the autonomous vehicle was stuck or not actually stuck (but close) and allow for even more fine-tuning of the predetermined threshold distance. For example, the predetermined threshold distance may be 10 meters, 20 meters or more or less. Of course, the predetermined threshold distance should be selected in order to balance the desire to engage the maneuver planning system and allow the autonomous vehicle to independently become unstuck while also avoiding triggering in situations when the autonomous vehicle is not actually stuck. For instance, turning to FIG. 8, a predetermined threshold distance D is represented by area 880. In this example, fence 760 and fence 770 are within the distance D of the autonomous vehicle 100.

As noted above, the forward planning system 168 and/or computing devices 110 may determine whether a fence within the predetermined threshold distance is associated with an object that is unlikely to move. To do so, the forward planning system may analyze labels for the object, such as those that might indicate that the object is a parked vehicle generated by the autonomous vehicle's perception system. In addition or alternatively, the forward planning system may analyzer behavior predictions for the object generated by the autonomous vehicle's behavior modeling systems. These behavior predictions may indicate how likely the object is to begin moving in the future or simply that the object is parked. If that likelihood is low, for instance less than a threshold value such as less than 5%, 10%, 20% or more or less, the forward planning system may determine that the autonomous vehicle is stuck and may automatically engage the maneuver planning system.

Figure 8:
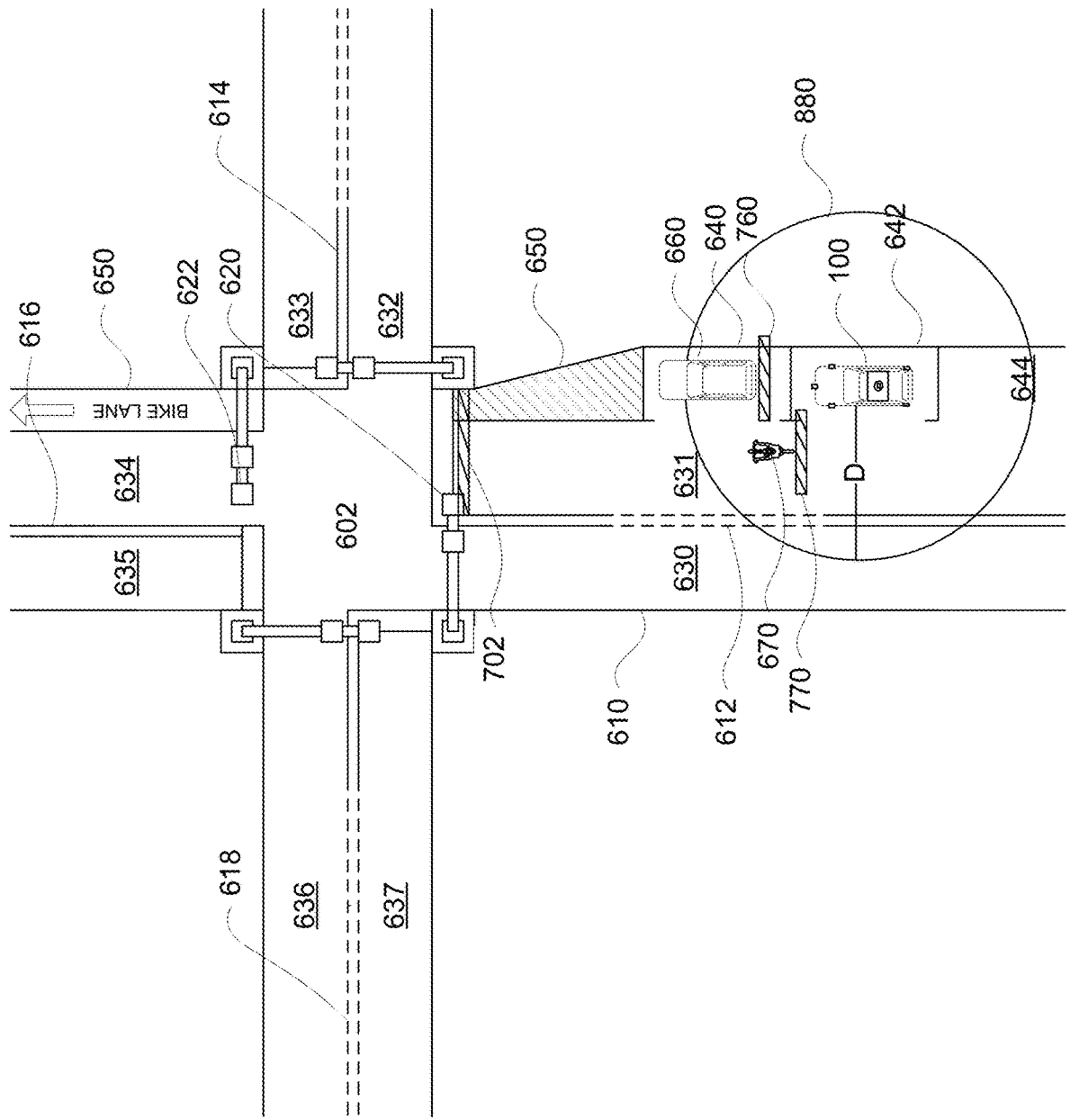
FIG. 8 is another example of an autonomous vehicle and data depicted with respect to a geographic area in accordance with aspects of the disclosure.

Referring to FIG. 8, the fences 760, 770 within the predetermined distance D of the autonomous vehicle 100 are associated with the vehicle 660 and bicyclist 670. In this example, the perception system 174 may generate and provide the perception system 168 with information indicating that the vehicle is stationary and the behavior modeling system 176 may generate and provide the perception system 168 with information indicating that the vehicle is unlikely to move in the future or simply parked. In this example, the likelihood of the bicyclist 670 moving may be greater 95%, and thus, the bicyclist may be disregarded when considering whether the autonomous vehicle is stuck. However, the likelihood of the vehicle 660 moving within the next 1 second or more or less may be less than 5% or the vehicle 660 may be classified by the behavior modeling systems as parked. In this regard, the forward planning system 168 may determine that the autonomous vehicle 100 is stuck because of the location and predicted behavior of the vehicle 660.

Returning to FIG. 10, at block 1030, based on the determination that the autonomous vehicle has become stuck, a maneuver planning system having one or more processors capable of generating trajectories that allow the autonomous vehicle to maneuver in reverse is automatically engaged. For instance the forward planning system 168 or computing devices 110 may send a signal to the maneuver planning system or otherwise take action in order to engage the maneuver planning system or, as in the example discussed above, a planning system may switch between modules of the forward planning system and the maneuver planning system.

Once engaged, one or more processors of the maneuver planning system 169 may generate trajectories in order to maneuver the autonomous vehicle to become unstuck or back to the route that the autonomous vehicle was following. To do so, the forward planning system 168 may provide the maneuver planning system 169 with a destination, such as a point along the route beyond the fence (or relevant fence as discussed further below). This destination may be a specific location and orientation of the vehicle at some predetermined number of meters or feet forward.

Figure 9:
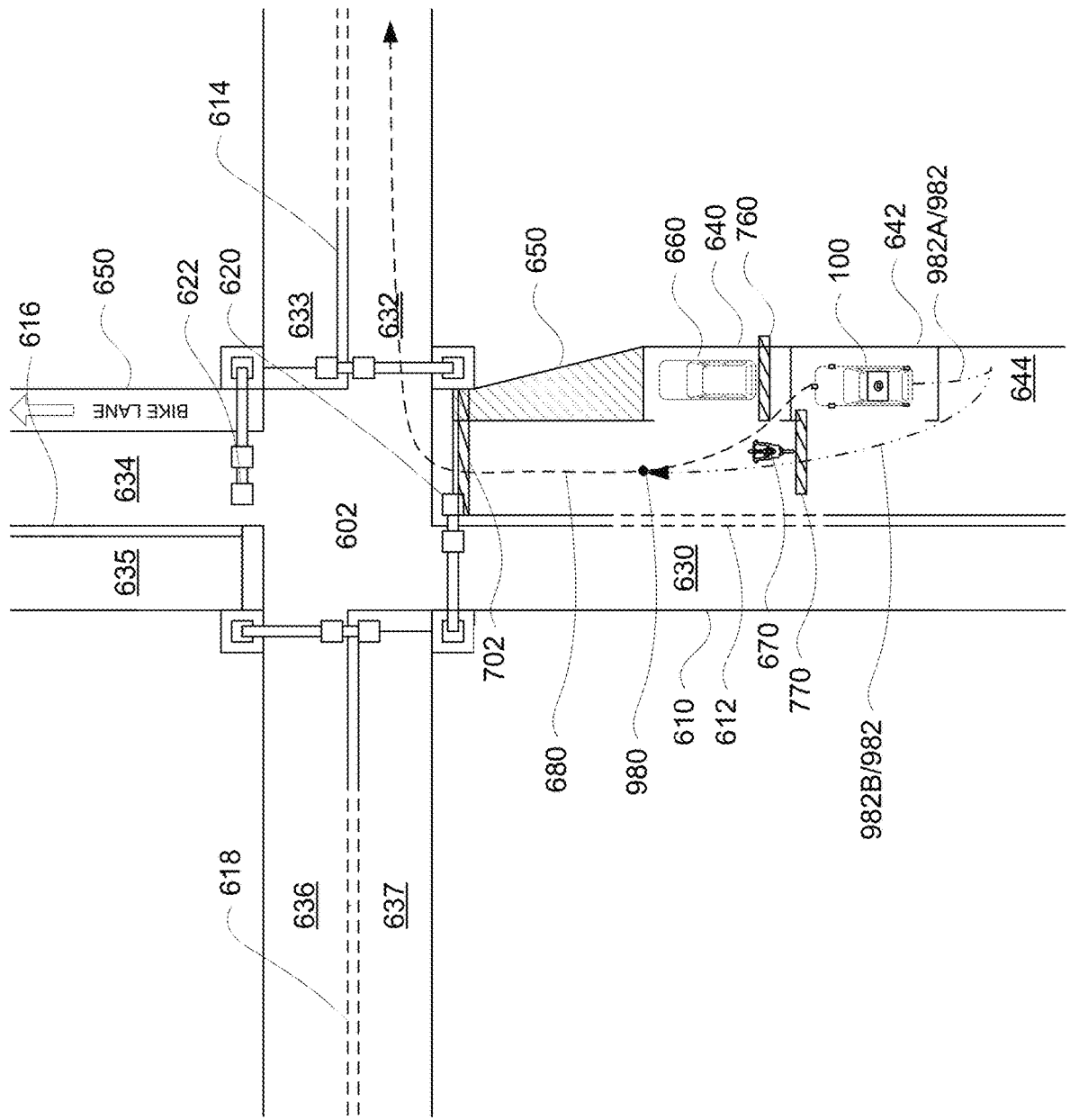
FIG. 9 is another example of an autonomous vehicle and data depicted with respect to a geographic area in accordance with aspects of the disclosure.

For example, turning to FIG. 9, point 980 represents a destination along the route 680 to which the maneuver planning system may attempt to route the autonomous vehicle 100. In this regard, the maneuver planning system 169 may generate a trajectory 982 (or a plurality of trajectories while the maneuver planning system is engaged). Unlike the forward planning system 168, the maneuver planning system 169 may utilize a reversing maneuver along portion 982A of trajectory 982 which allows the autonomous vehicle 100 to maneuver in reverse (i.e. back up). Thereafter, the trajectory 982 may include portion 982B which allows the autonomous vehicle 100 to move forward towards (and eventually reach) the destination of point 980. In this way, the autonomous vehicle is able to avoid the fence 760, and the computing devices 110 may use the trajectory 982 in order to maneuver the autonomous vehicle 100 from the parked state towards the destination of point 980 in order to reach the route 680 as described above.

In some instances, because the maneuver planning system 169 is being engaged automatically (rather than manually by a remote human operator), additional constraints may be placed upon the maneuver planning system's trajectory planning. For example, the maneuver planning system may only allow the autonomous vehicle to reverse a certain distance, only move so far laterally or longitudinally, avoid crossing into any or more than one other lane, etc. In addition or alternatively, the maneuver planning system may be limited in how far it is able to reverse based on geography, traffic congestion, posted speed limits, etc. or situations which are likely to be very unexpected or cause inconvenience to other road users. (e.g. in San Francisco during rush hour traffic, reversing may be inappropriate, when an emergency vehicle is approaching the autonomous vehicle, whether the autonomous vehicle is close to—in front or behind—an intersection, whether there are other vehicles stacked waiting for a light to change, when there are pedestrians nearby walking or entering/exiting nearby vehicles, etc.).

Once the point along the route has been reached, the maneuver planning system 169 may automatically disengage, allowing the forward planning system 168 to resume generating trajectories and maneuver the autonomous vehicle towards its ultimate destination. Alternatively, as soon as the forward planning system 168 is able to generate a trajectory and make forward progress towards the destination the forward planning system may again do so, disengaging the maneuver planning system by sending an additional instruction to the maneuver planning system. However, to avoid a continuous loop of engaging and disengaging, the forward planning system may also be required to determine that the autonomous vehicle is no longer stuck (i.e. there is no longer a fence within a predetermined threshold distance of the autonomous vehicle associated with an object that is unlikely to move) before disengaging the maneuver planning system by sending an instruction to the maneuver planning system.

In some situations, there may be multiple fences, so the forward planning system and/or computing devices 110 may also identify the relevant fence by selecting the one that is dominant or is likely to cause the autonomous vehicle to brake hardest. Such fences are most likely those that are closest to the autonomous vehicle.

Returning to FIG. 10, at block 1040, after engaging the maneuver planning system, a new trajectory for the autonomous vehicle to follow may be generated. At block 1050, the autonomous vehicle is controlled according to the new trajectory. Once the maneuver planning system has been disengaged, the forward planning system may continue to generate trajectories according to the autonomous vehicle's current state. In this regard, when the maneuver planning system is disengaged, the autonomous vehicle may remain in the state immediately before the maneuver planning system was engaged (e.g. the pulling out state). This may ensure that state updates are performed by the forward planning system only which may be configured to more aptly determine when it is appropriate to transition the state, though in some systems it may be acceptable to allow the maneuver planning system to change the state. For instance, once the maneuver planning system 169 generates the trajectory 982, the autonomous vehicle 100 is controlled in order to follow the trajectory 982 and eventually reach the destination of point 980. At some point after the trajectory 982 is generated as described above, the forward planning system may then begin to generate new trajectories in order to cause the autonomous vehicle 100 to continue to follow the route 680 (or an updated route generated by the routing system). These new trajectories may then be used to control the autonomous vehicle 100 as described above.

In some instances, before automatically engaging the maneuver planning system, the forward planning system may wait a predetermined period of time after determining that the autonomous vehicle is stuck. This predetermined period of time may be 1 second or more or less and may be selected to allow the forward planning system to confirm that it is unable to generate a trajectory before engaging the maneuver planning system. This may avoid unnecessary use of the maneuver planning system.

In some instances, the aforementioned features may also be used when the autonomous vehicle is in a "pulling over" or "pulling in" state.

In some instances, the features described herein may lend themselves to fine tuning via simulations. For instance, log data from autonomous vehicles operating in an autonomous driving mode that has been labeled as stuck using the aforementioned machine learned models may be used to test how the autonomous vehicle performs in becoming unstuck as well as to determine how changes to the predetermined threshold distance and/or the predetermined period of time affect the autonomous vehicle's performance via regression testing. As an example, performance may be gauged based on how long the autonomous vehicle was found to be stuck by the forward planning system, how far and/or how many times the autonomous vehicle had to reverse to become unstuck, etc.

The features described herein may allow autonomous vehicles to more readily respond to situations in which the autonomous vehicle becomes stuck. By automatically engaging a specialized planning system, this may replace the need for a remote human operator to connect with and move the autonomous vehicle to become unstuck, saving on both time and overall costs, while also limiting the situations in which the maneuver planning system is engaged automatically based on state and heuristics. This, in turn, may provide a faster, more consistent response of these autonomous vehicles in such situations. For instance, improvements may be expected in yielding time metrics, duration of an autonomous vehicle stuck, and potentially the number of times that autonomous vehicles become stuck and require assistance from remote human operators.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method of managing maneuvering of an autonomous vehicle in certain situations, the method comprising:
 identifying, by one or more processors of a forward planning system of the autonomous vehicle, a state of the autonomous vehicle, wherein the forward planning system is limited configured to plan forward trajectories for the autonomous vehicle to move forward and is not configured to plan reverse trajectories allowing the autonomous vehicle to move in reverse;
 based on the state of the autonomous vehicle, determining, by the one or more processors of the forward planning system, whether the autonomous vehicle has become stuck;
 based on the determination that the autonomous vehicle has become stuck, automatically engaging, by the one or more processors of the forward planning system, a maneuver planning system different from the forward planning system, the maneuver planning system having one or more processors capable of generating reverse trajectories that allow the autonomous vehicle to maneuver in reverse;
 after engaging the maneuver planning system, generating, by the one or more processors of the forward planning system, a new forward trajectory for the autonomous vehicle to follow; and
 controlling the autonomous vehicle according to the new forward trajectory.

2. The method of claim 1, wherein the state of the autonomous vehicle is pulling out after a pick up or drop off of passengers or goods.

3. The method of claim 1, wherein determining whether the autonomous vehicle has become stuck is based on a plurality of heuristics.

4. The method of claim 3, wherein the heuristics include looking for a simulated barrier associated with an object that is within a predetermined threshold distance of the autonomous vehicle.

5. The method of claim 4, wherein the simulated barrier is a location that the autonomous vehicle will not cross without first stopping or yielding.

6. The method of claim 4, wherein the object is a road user object including one of a pedestrian, bicyclist, or vehicle.

7. The method of claim 4, wherein the heuristics further include determining that the object is unlikely to move.

8. The method of claim 7, wherein the object is unlikely to move when it is associated with a label identifying that the object is a parked vehicle.

9. The method of claim 7, wherein the object is unlikely to move when a behavior prediction for the object indicates a likelihood that the object will begin moving that is less than a threshold value.

10. The method of claim 4, further comprising, providing, by the one or more processors of the forward planning system, a destination to the one or more processors of the maneuver planning system, wherein the destination is beyond a simulated barrier.

11. The method of claim 1, further comprising, providing, by the one or more processors of the forward planning system, a destination to the one or more processors of the maneuver planning system, wherein the destination is a point along a route generated by a routing system of the autonomous vehicle.

12. The method of claim 11, wherein generating the new forward trajectory is based on when the autonomous vehicle reaches the destination.

13. The method of claim 12, further comprising, automatically disengaging the maneuver planning system when the autonomous vehicle is determined to no longer be stuck.

14. The method of claim 11, wherein once the autonomous vehicle reaches the destination, automatically disengaging the maneuver planning system.

15. The method of claim 1, wherein the maneuver planning system includes constraints on a distance the autonomous vehicle is able to maneuver in reverse.

16. The method of claim 1, wherein the maneuver planning system includes constraints on the autonomous vehicle crossing into a lane.

17. The method of claim 1, wherein the maneuver planning system includes constraints on the autonomous vehicle crossing more than one other lane.

18. The method of claim 1, further comprising, before automatically engaging the maneuver planning system, waiting a predetermined period of time to allow the forward planning system to confirm that the forward planning system is unable to generate a forward trajectory before engaging the maneuver planning system.

19. A system for managing maneuvering of an autonomous vehicle in certain situations, the system comprising:
 a forward planning system configured to plan forward trajectories for the autonomous vehicle to move forward and not configured to plan reverse trajectories that allow the autonomous vehicle to move in reverse, the forward planning system having one or more processors configured to:
 identify a state of the autonomous vehicle;
 based on the state of the autonomous vehicle, determine whether the autonomous vehicle has become stuck;
 based on the determination that the autonomous vehicle has become stuck, automatically engage a maneuver planning system different from the forward planning system, the maneuver planning system having one or more processors capable of generating reverse trajectories that allow the autonomous vehicle to maneuver in reverse;
 after engaging the maneuver planning system, generate a new forward trajectory for the autonomous vehicle to follow; and
 control the autonomous vehicle according to the new forward trajectory.

\* \* \* \* \*

UNITED STATES PATENT AND TRADEMARK OFFICE
CERTIFICATE OF CORRECTION

| | | |
|---|---|---|
| PATENT NO. | : 12,409,855 B2 | Page 1 of 1 |
| APPLICATION NO. | : 17/579112 | |
| DATED | : September 9, 2025 | |
| INVENTOR(S) | : Mishika Vora and Matthew Paul McNaughton | |

It is certified that error appears in the above-identified patent and that said Letters Patent is hereby corrected as shown below:

In the Claims

Claim 1, Column 18, Line 43:
Now reads: "is limited configured" should read -- is configured --

Signed and Sealed this
Twenty-first Day of October, 2025

John A. Squires
*Director of the United States Patent and Trademark Office*